United States Patent
Kim et al.

(10) Patent No.: US 8,295,254 B2
(45) Date of Patent: Oct. 23, 2012

(54) METHOD AND APPARATUS FOR GROUPING MOBILE NODES IN EXTENDED WIRELESS LAN

(75) Inventors: Min-soo Kim, Seoul (KR); Song-yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 983 days.

(21) Appl. No.: 11/429,105

(22) Filed: May 8, 2006

(65) Prior Publication Data

US 2006/0268823 A1 Nov. 30, 2006

(30) Foreign Application Priority Data

May 7, 2005 (KR) .................. 10-2005-0038211

(51) Int. Cl.
*H04W 4/00* (2009.01)
(52) U.S. Cl. ...... 370/338; 370/311; 370/328; 455/435.3
(58) Field of Classification Search .................. 370/311, 370/328, 338; 455/435.3; 709/230, 238
See application file for complete search history.

(56) References Cited

U.S. PATENT DOCUMENTS

| 6,701,361 | B1 | 3/2004 | Meier | |
|---|---|---|---|---|
| 7,293,107 | B1 * | 11/2007 | Hanson et al. | 709/245 |
| 7,315,519 | B2 * | 1/2008 | Sarikaya et al. | 370/310 |
| 7,414,996 | B2 * | 8/2008 | Fan | 370/338 |
| 2002/0098840 | A1 | 7/2002 | Hanson et al. | |
| 2004/0167988 | A1 | 8/2004 | Rune et al. | |
| 2004/0202120 | A1 | 10/2004 | Hanson | |

FOREIGN PATENT DOCUMENTS

| EP | 1172969 A2 | 1/2002 |
|---|---|---|
| JP | 2003-324449 A | 11/2003 |

OTHER PUBLICATIONS

Communication from the State Intellectual Property Office of P.R. China dated Mar. 3, 2011, in counterpart Application No. 200610078526.7.
Second Office Action issued Sep. 2, 2010 in counterpart Chinese Application No. 200610078526.7.
Japanese Office Action issued in corresponding application No. 2006-128200 on May 10, 2011.

* cited by examiner

*Primary Examiner* — Rafael Pérez-Gutiérrez
*Assistant Examiner* — Liton Miah
(74) *Attorney, Agent, or Firm* — Sughrue Mion, PLLC

(57) ABSTRACT

A method and apparatus for grouping wireless access points and re-grouping access points separated from a group in order to construct a clear and efficient transmission connection channel in an extended wireless LAN architecture are provided. Accordingly, a grouped mobile node determines disconnection of a connection channel to the group, and if the connection channel is disconnected, the mobile node searches for a connection channel to the existing group or a new group to re-subscribe thereto, so that all the mobile nodes can always be in a grouped state. As a result, it is possible to prevent broadcast storm in which broadcasted frames are repetitively transmitted along a loop in an extended wireless LAN architecture.

11 Claims, 11 Drawing Sheets

METHOD AND APPARATUS FOR GROUPING MOBILE NODES IN EXTENDED WIRELESS LAN

CROSS-REFERENCE TO RELATED PATENT APPLICATION

This application claims priority from Korean Patent Application No. 10-2005-0038211, filed on May 7, 2005, in the Korean Intellectual Property Office, the disclosure of which is incorporated herein in its entirety by reference.

BACKGROUND OF THE INVENTION

1. Field of the Invention

Apparatuses and methods consistent with the present invention relate to effectively constructing data transmission channels in an extended wireless local area network (LAN) architecture constructed with inter-communicating mobile nodes.

2. Description of Related Art

A wired network includes relays having both wire and wireless interfaces in order to transmit data to mobile nodes connected to a wireless network. In the IEEE 802.11 standard, access points (APs) operate like a relay in a wireless LAN. As shown in FIG. 1, AP1 130 and AP2 140 are connected to the Internet 100 through a router 110. AP1 130 and AP2 140 receive a frame having a media access control (MAC) address, that is, a link layer address from the Internet 100 or a host 120 through a wired network and forwards the frame to stations (STAs) 150, 160, 170, and 180, that is, the mobile terminals included in a basic service set (BSS) according to the MAC address. In general, a range of the BSS is determined based on a wave approaching distance (coverage range) of the AP. In some cases, like in the case of STA3 170, two or more ALP coverage ranges may overlap, so that there may be a mobile station capable of receiving a transmission from two or more APs. In this case, according to the IEEE 802.11 standard, BSSID is used for all the STAs to be wireless-linked to one AP and receive and transmit the frame from and to the one AP.

However, the IEEE 802.11 standard does not apply to a recently-developed extended wireless LAN architecture wherein a mobile node can route a frame in a wireless manner, like in a wireless mesh network which is separated from the wired network. In the extended wireless LAN architecture, the mobile nodes can receive and transmit frames therebetween in a wireless manner, so that an ad-hoc network can be constructed. Therefore, there is a problem of broadcast storm in which broadcasted frames are repetitively transmitted along a loop in the extended wireless LAN architecture. In addition, the repetition along the loop may be blocked by using a method re-constructing a topology such as spanning tree. However, the method has a problem in that the frame transmission connection channel is inefficiently constructed.

In addition, when the frame is transmitted through the wired network to the mobile node, which can communicate with two or more portals (transmission points connecting the wired network with the wireless network), the extended wireless LAN architecture does not clearly specify which AP forwards the frame.

SUMMARY OF THE INVENTION

The present invention provides a method and apparatus for grouping wireless access points and re-grouping access points separated from a group in order to construct a clear and efficient transmission connection channel in an extended wireless LAN architecture.

According to an aspect of the present invention, there is provided a method of allowing a mobile node subscribing in a predetermined group among a plurality of groups, each group constructed with mobile nodes that intercommunicate and have a function of frame-routing in a wireless network, to re-subscribe to any one of the groups, the method including: (a) determining whether or not a connection channel of the mobile node to the predetermined group is disconnected; (b) searching connection channels of the mobile node to the groups based on a result of the determination in (a); and (c) setting a connection channel of the mobile node to any one of the groups based on a result of the searching in (b).

According to another aspect of the present invention, there is provided a computer readable recording medium having embodied thereon a computer program for executing the above method.

According to another aspect of the present invention, there is provided an apparatus serving as a mobile node having a function of frame-routing in a wireless network, the apparatus including: a determination unit determining whether or not to subscribe to a group managed by a fixed node connecting the wireless network with another network different from the wireless network when a frame including identification information of the fixed node is received; a connection channel setting unit setting a connection channel to the fixed node based on a determination of the determination unit; and a transmission unit transmitting the identification information of the mobile node to the fixed node so as to allow the fixed node to register the mobile node as a member of the group.

According to another aspect of the present invention, there is provided a method of allowing a fixed node, connecting a wireless network which includes mobile nodes that intercommunicate and have a function of frame-routing with another network different from the wireless network, to group the mobile nodes, the method including: receiving a frame including identification information of a mobile node from the mobile node which is to subscribe to a group managed by the fixed node; and registering the mobile node as a group member of the group managed by the fixed node based on the identification information of the mobile node.

According to another aspect of the present invention, there is provided a computer readable recording medium having embodied thereon a computer program for executing the above method.

According to another aspect of the present invention, there is provided an apparatus serving as a fixed node connecting a wireless network, which includes mobile nodes that intercommunicate and have a function of frame-routing, with a network different from the wireless network, the apparatus including: an advertisement frame generation unit generating a frame including identification information of the fixed node and repetitively broadcasting the frame to the wireless network; and a group information storage unit allowing the mobile node to subscribe to a group managed by the fixed node by storing the identification information of the mobile node transmitted from the mobile node which received the frame.

According to another aspect of the present invention, there is provided a method of subscribing to a group of mobile nodes that intercommunicate and have a function of frame-routing in a wireless network, the method including: (a) determining whether or not to subscribe to a group managed by the fixed node connecting the wireless network with a network different from the wireless network; and (b) setting a connection channel to the fixed node if subscription to the group is determined.

According to another aspect of the present invention, there is provided a computer readable recording medium having embodied thereon a computer program for executing the above method.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
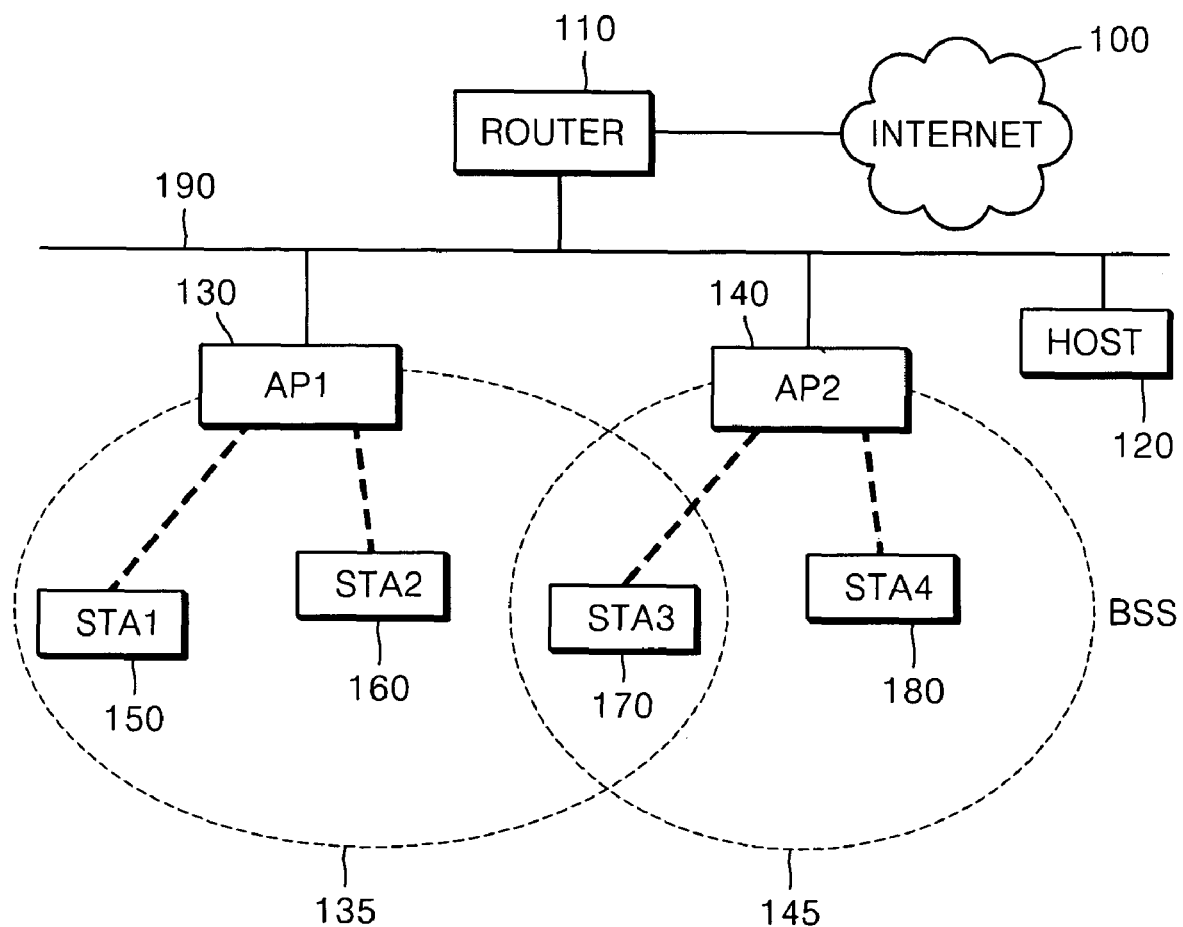
FIG. 1 is a view showing a configuration of a general wireless LAN architecture defined in the IEEE 802.11 standard.
Figure 2:
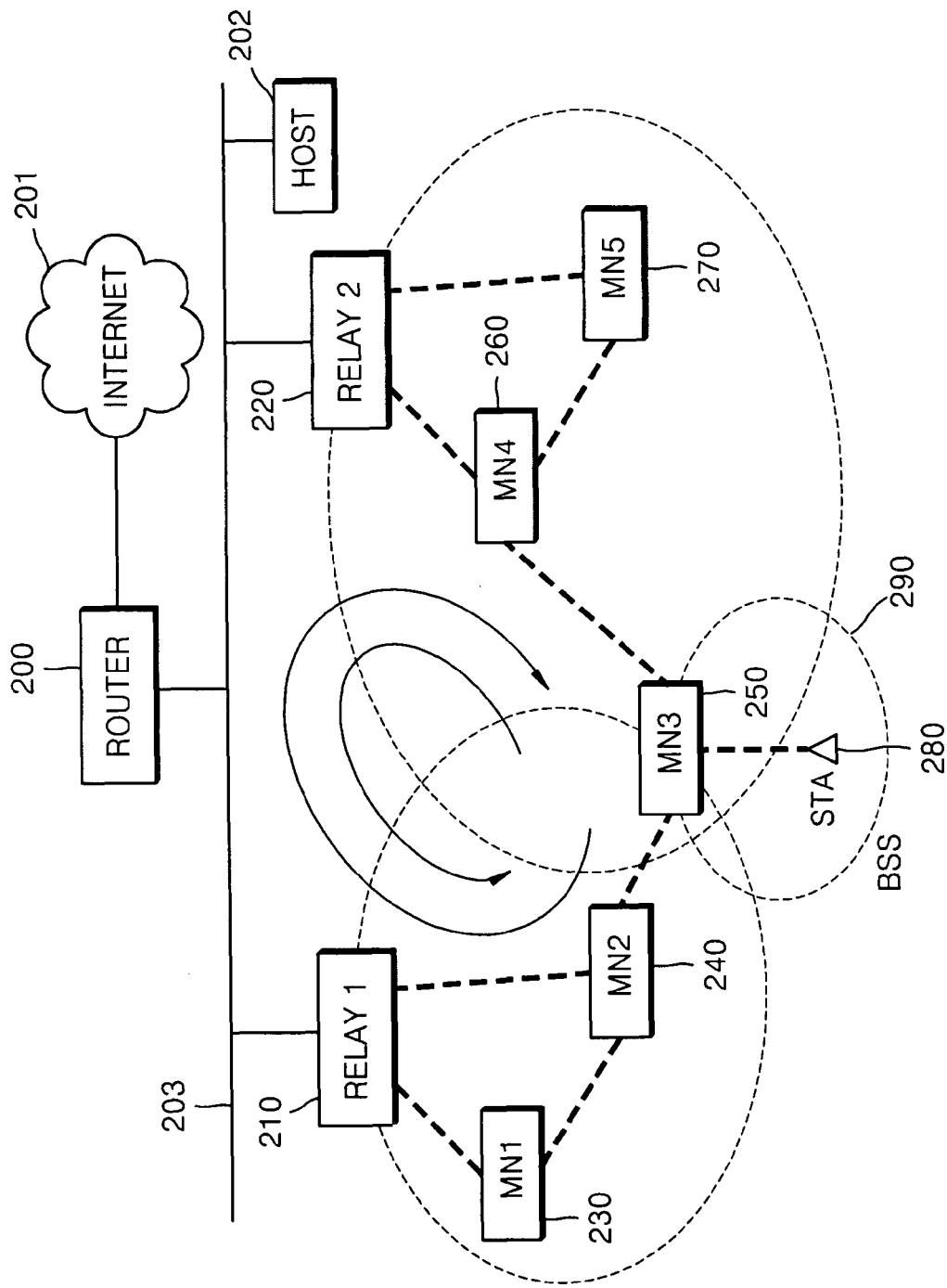
FIG. 2 is a view showing a configuration of an extended wireless LAN architecture according to an exemplary embodiment of the present invention.

FIG. 2 is a view showing a configuration of an extended wireless LAN architecture according to an exemplary embodiment of the present invention.

As shown in FIG. 2, the Internet 201 is connected to a wired network 203 through a router 200, and relays 210 and 220 and other host 202 are directly connected to the wired network 203. Here, the wired network 203 may be a backbone network in the wireless LAN architecture. In general, the Ethernet is used as the wired network 203. In the present invention, the term "wired network" is used to specify a network constructed with relays, however, the present invention is not limited thereto. In some applications, the network may be a wireless network.

The relays 210 and 220 are apparatuses for relaying frames between the wired network 203 and a wireless network. Since the wired network 203 does not comply with the IEEE 802.11 standard for wireless LAN architectures, the relays 210 and 220 have to interface different architectures. In the IEEE 802.11 standard, the relay is referred to as a portal, but the present invention is not limited to the portal. Therefore, in the present invention, the relay is used as a more generalized term.

The mobile nodes 230, 240, 250, 260, and 270 are introduced into an extended wireless LAN architecture. The mobile nodes 230, 240, 250, 260, and 270 route the frames in a wireless manner based on data link layer address information of an OSI reference model, that is, a MAC address and communicate with each other through the wireless network.

In general, the mode nodes may be considered to be wireless APs. However, since the mode nodes may perform only the routing without BSS, the term "mobile nodes" is used as a generic meaning and, hereinafter, referred to as MN. However, the MN3 250 is a wireless AP having a BSS 290, and an STA 290 is included in the BSS 290.

A receiver address of the frame which is transmitted from the router 200 or the host 202 and received by the relays 210 and 220 is a MAC address, and frame forwarding of the relays are performed based on the MAC address. For convenience of description, the MAC address is an example of information capable of identifying nodes in the network. However, the present invention is not limited thereto, and other types of data may be used in some examples.

In such a structure, when a frame which is transmitted from the Internet 201 to the STA 290 reaches the wired network 203, both of the relay 1 210 and the relay 2 220 can forward the frame to the MN1 230, the MN2 240, the MN3 250, the MN4 260, and MN5 270. This is because the mobile nodes communicate with each other to constitute an ad-hoc network, so that the transmission range is determined based on a topology structure rather than a wave approaching distance of the relay. Accordingly, various transmission connection channels are formed. Since there is no field in the frame of the link layer where redundant transmission can be determined, when the STA 290 broadcasts the frame, a loop shown as an arrow in FIG. 2 may be formed.

Figure 3:
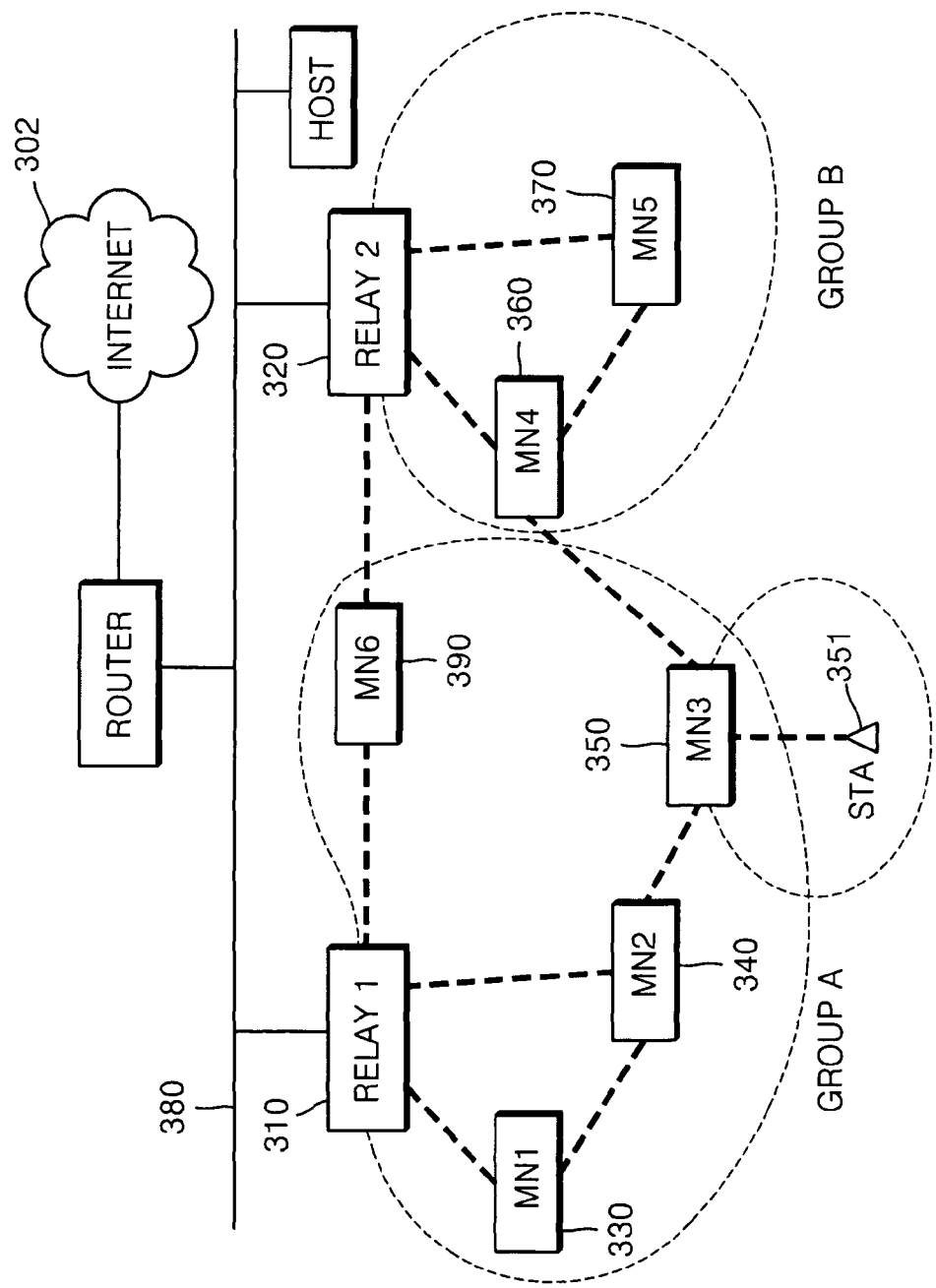
FIG. 3 is a conceptual view showing grouping of mobile nodes according to an exemplary embodiment of the present invention.

FIG. 3 is a conceptual view showing grouping of mobile nodes according to an exemplary embodiment of the present invention.

As shown in FIG. 3, the MN1 330, the MN2 340, and the MN3 350 are included in a group A managed by the relay 1 310, and the MN4 360 and MN5 370 are included in a group B managed by the relay 2 320. The relays 310 and 320 store MAC address information of mobile terminals, that is, mobile stations included in the group in which the relays are included. Therefore, as described above, when the frame transmitted from the Internet 302 to the STA 351 reaches the wired network 380, since the MAC address according to the reception address field of the frame matches the MAC address of the mobile station included in the group where the relay 1 310 is included, the relay 1 310 forwards the received frame to finally transmit the frame to the STA 351. However, the relay 2 320 determines that a final receiver of the frame is not included in the group where the relay 2 320 is included, so that the relay 2 320 does not forward the frame but discards the frame.

In a case where the proxy ARP (Address Resolution Protocol) is used, it is sufficient that the relays store only the MAC addresses of the mobile nodes included in the group where the relays are included. It is unnecessary for the relays to store the MAC addresses of all the mobile stations. Namely, in the above case, when the relay 1 310 broadcasts the ARP frame, instead of the STA 351, the MN3, 350 responds to the broadcast, so that the relay 1 310 may forward the received frame to the MN3 350. However, in this case, the mobile nodes must store all the MAC addresses of the mobile stations included in the BSS where the mobile nodes are included.

When the mobile stations included in some mobile nodes broadcast the frame, if the mobile stations store group IDs, that is, information for distinguishing the group where the mobile nodes are included with other groups, the problem of broadcast storm can be solved. Namely, when the STA 351 included in the group A broadcasts the frame, the MN4 360 included in the group B does not forward the frame transmitted from the MN3 250 but discards the frame, so that a repetitive transmission loop cannot be formed. Here, the group ID is not limited to a specific type, and the MAC addresses of the relays may be the group IDs.

Figure 4A:
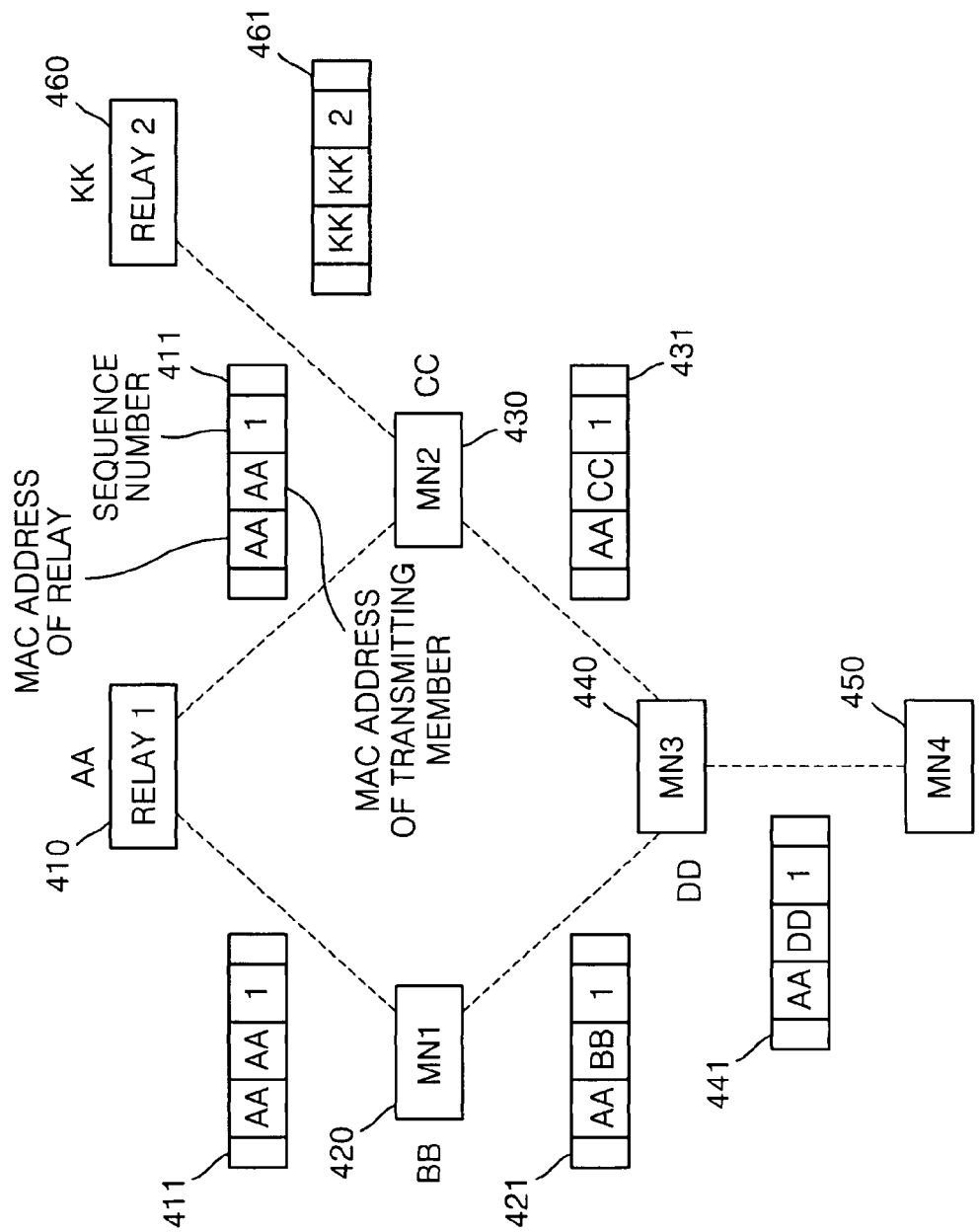
FIGS. 4A to 4B are flowcharts showing a procedure of grouping mobile nodes in a flow of a advertisement frame therein according to an exemplary embodiment of the present invention.

FIG. 4A is a flowchart showing a procedure of grouping the mobile nodes according to an exemplary embodiment of the present invention.

The relay 1 410 periodically broadcasts an advertisement frame 411 in order to inform the mobile nodes of is presence, so that the mobile nodes subscribe to the group where the relay 1 410 is included. As shown in FIG. 4A, the advertisement frame 411 includes the MAC address of the relay 1 410 and a MAC address and a sequence number of a transmitting member. The MAC address of the relay 1 410 serves as a group ID for distinguishing the group of the relay 1 410 from other groups. The MAC address of the transmitting member is a MAC address of a member which transmits the advertisement frame. In this case, since the relay 1 410 directly generates and transmits the advertisement frame 411, the relay 1 410 becomes the transmitting member. The sequence number is information for preventing redundant reception of the advertisement frame. Namely, when all the relays periodically and repetitively broadcast the advertisement frames, all the same advertisement frames broadcasted at the same time may be redundantly received by the mobile nodes through different connection channels according to characteristics of the wireless mesh network. The sequence numbers having different values according to the time when the advertisement frames are broadcasted are included, so that the mobile nodes determine based on the sequence number whether or not the frames are a previously received advertisement frame, and if there is redundant reception, the advertisement frame can be discarded. For example, a method of increasing the sequence number by 1 every time the broadcasting is performed may be used.

The MN1 420 receiving the advertisement frame 411 records BB, that is, the MAC address thereof in the MAC address field of the transmitting member and transmits the BB to the MN3 440. As shown in FIG. 4A, the MN2 430 can receive the advertisement frame 461 broadcasted by the relay 2 460. Here, the MN2 430 must select only one advertisement frame. When selecting the advertisement frame 411 of the relay 1 410, the MN2 430 is included in the group of the mobile nodes managed by the relay 1 410. When selecting the advertisement frame 461 of the relay 2 460, the MN2 430 is included in the group of the relay 2 460. Here, it is assumed that the advertisement frame 411 of the relay 1 410 is selected. In the present invention, the criterion for selecting the group among the mobile nodes is not limited to a specific one, the selection criterion may be determined as needed during implementation.

On the other hand, the mobile nodes broadcast only the selected frames. In this case, since the MN2 430 selects the advertisement frame 411 of the relay 1 410, the MN2 430 discards the advertisement frame 461 of the relay 2 460 and records CC, that is, the MAC address thereof in the advertisement frame 411 of the relay 1 410 to broadcast it.

As shown in FIG. 4A, the MN3 440 receives the advertisement frames from both of the MN1 420 and MN2 430, so that the MN3 440 must select one of the advertisement frames similarly to the MN2 430. The difference is that the two advertisement frames in this case are the advertisement frames of the group managed by the relay 1 410. MN3 440 selects one advertisement frame in order to have one transmitting member, that is, one parent node. This is described later in detail. In addition, similar to the case of selecting the group, the selection criterion is not limited to a specific one in the present invention.

Finally, if the MN3 440 selects the advertisement frame 421 transmitted from the MN1 420, the advertisement frame 441 where the MAC address DD of the MN3 440 is recorded is transmitted to the MN4 450, so that the procedure of the grouping is completed.

In the procedure, all the mobile nodes have one connection channel through which the mobile nodes approach to the relay of the group, and all the mobile nodes on the connection channel are included in the same group. Namely, by tracking the parent nodes of the mobile nodes, the connection channel through which the relay is approached can be acquired, and all the nodes must be informed of the MAC address of the parent nodes and the MAC addresses of the relays of the group. For example, the MN3 440 is included in the group managed by the relay 1 410, and the MN1 420 is selected as the parent nodes. Therefore, the MAC address AA of the relay 1 410 and the MAC address BB of the MN1 420 must be stored. The informing of the MAC addresses of the parent nodes is to identify the beacon frame for detecting disconnection of the connection channel between the mobile nodes and the group.

Figure 4B:
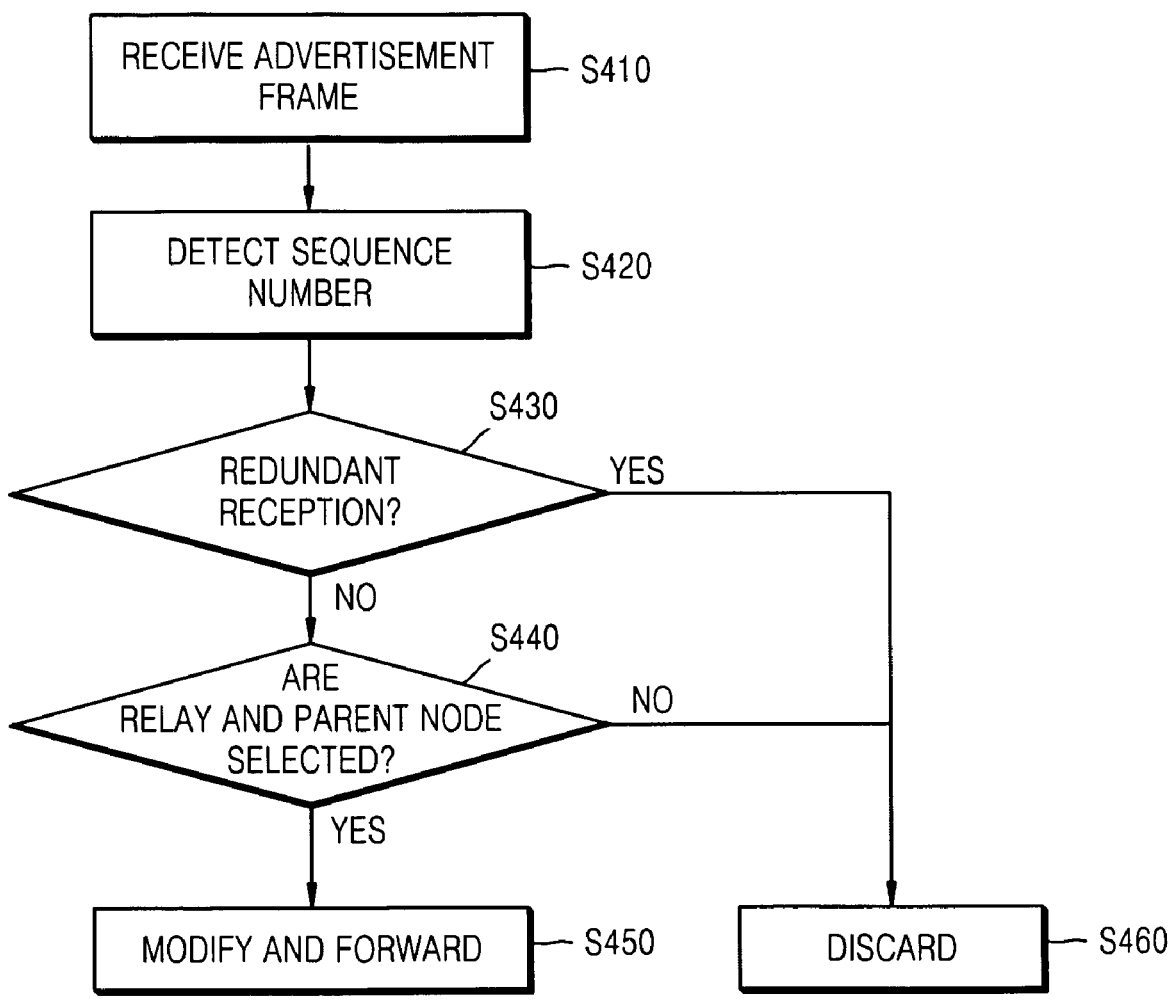

FIG. 4B is a flowchart showing a procedure of processing the advertisement frame by the mobile nodes according to an exemplary embodiment of the present invention.

When the advertisement frame is received from a relay (S410), a sequence number included in the advertisement frame is read out (S420). Next, it is determined whether or not the advertisement frame is a previously received advertisement frame from different connection channels (S430). If the reception is a repetitive reception, the received advertisement frame is discarded (S460). If the reception not a repetitive reception, it is determined based on the group ID included in the advertisement frame, that is, the MAC address of the relay and the MAC address of the transmitting member whether or not to subscribe to the group of the relay or whether or not to select the transmitting member as the parent node (S440). As a result, only if both of the MAC addresses are selected, the mobile node records the MAC address thereof in the MAC address field of the transmitting field and broadcasts the MAC address thereof (S450). If not, the advertisement frame is discarded (S460).

Figure 5A:
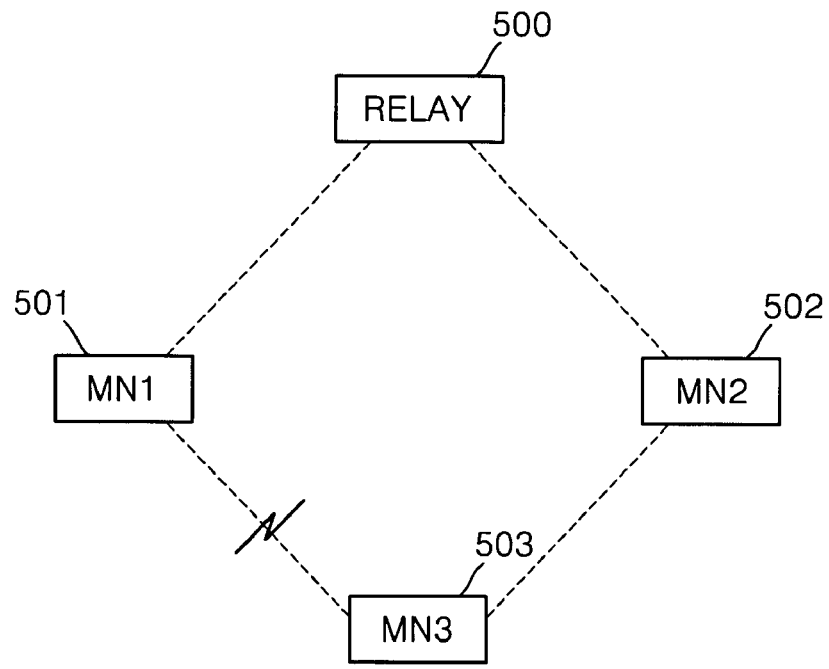
FIGS. 5A to 5C are views showing a procedure of detecting disconnection of a connection channel between mobile nodes and an existing group.
Figure 5B:
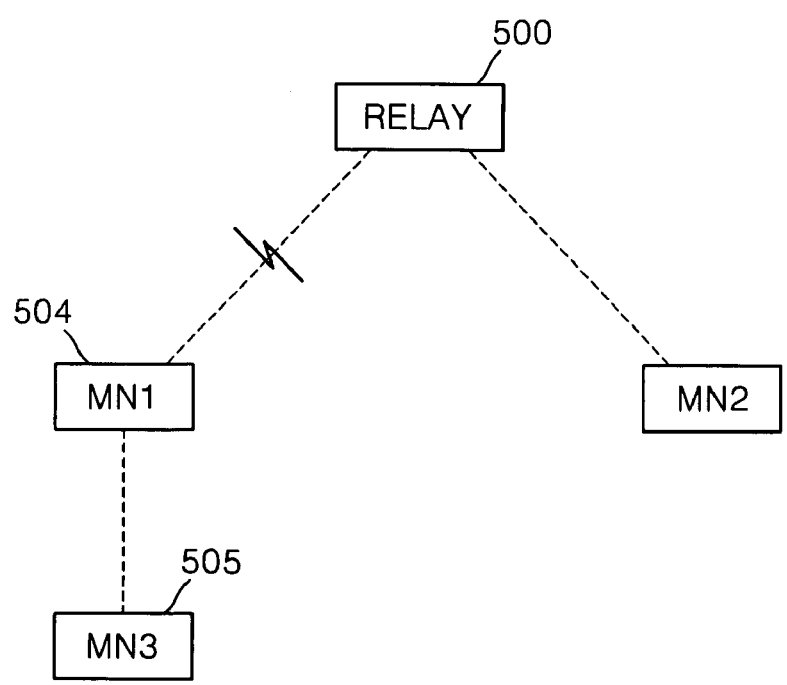
Figure 5C:
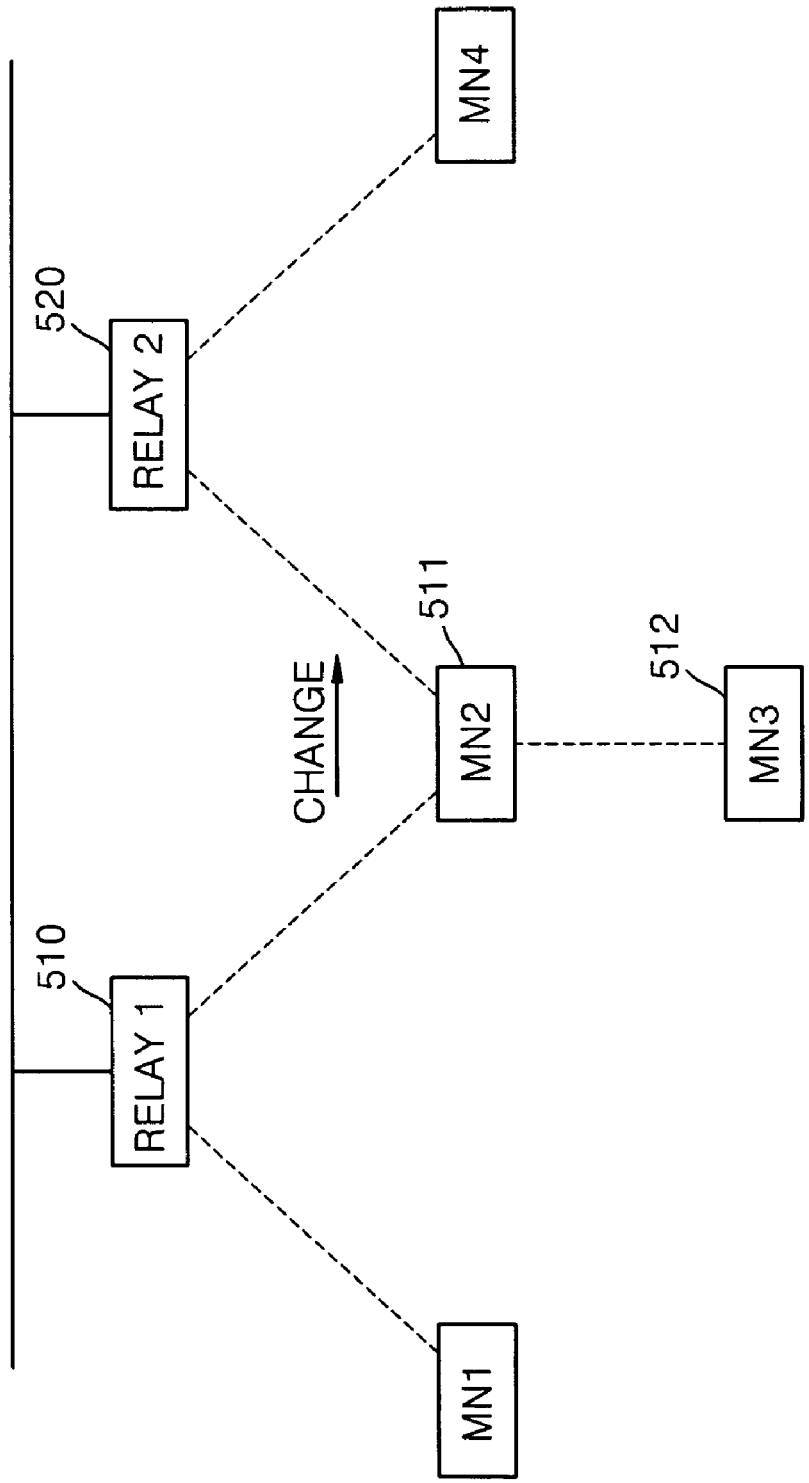

FIGS. 5A to 5C are views showing a procedure of detecting disconnection of a connection channel between mobile nodes and an existing group according to an exemplary embodiment of the present invention.

When the mobile nodes which are grouped by the grouping method according to exemplary embodiments of the present invention do not move and the wave reception is not influenced, the wireless network topology in the grouped state does not change. However, since the location of the mobile nodes in the wireless network according to exemplary embodiments of the present invention can freely change, in some cases, the connection channel between the mobile nodes and the existing group may be disconnected. In this case, there is a need for a procedure of re-subscribing to the existing group or other groups. Now, various cases will be described in detail.

A beacon frame is transmitted from all the fixed nodes and mobile nodes in the wireless network according to exemplary embodiments of the present invention and it reaches all the nodes existing within a predetermined distance. The beacon frame includes the MAC address of the relay, that is, the group ID of the group where the mobile nodes are included and the MAC address of the transmitting member which is the parent nodes.

In FIG. 5A, the MN3 503 subscribes to the group of the relay 500 by selecting the MN1 501 as the parent node. The MN3 503 receives the beacon frame transmitted periodically by the MN1 501. In addition, the MN3 503 also receives the beacon frame from the MN2 502. However, since the MN3 503 is informed of the MAC address of the parent node thereof, the MN3 503 can distinguish the beacon frame required for detecting the disconnection of the connection channel from other beacon frames.

After that, when the communication between the MN1 501 and the MN3 503 is disconnected due to various causes such as defective channel, abnormal operation of the mobile nodes, and/or movement of the mobile nodes, the MN3 503 may not receive the beacon frame from the MN1 501 for a predetermined time. In this case, it is determined that the MN3 503 is disconnected from the parent node, that is, the MN1 501. In this case, the procedure of re-subscribing to the MN2 502 by selecting the MN2 502 as the parent node must be performed.

In FIG. 5B, the communication between the MN1 504, that is, the parent node of the MN3 505 and the relay 500 of the MN1 504 is disconnected. Since there is no node which the MN1 504 can select as the parent node, there is no connection channel which can be grouped. Therefore, the MN1 504 transmits the beacon frame by setting the group ID, that is, the MAC address of the relay to 0. The MN3 505 receiving the beacon frame can detect that the MN3 505 is disconnected from the existing group. FIG. 5C shows a case where the MN2 511 included in the relay 1 510 changes the group thereof into the group of the relay 2 520. Namely, when the MN2 511 selects the advertisement frame of the relay 2 520, the MAC address of the relay 2 520 is recorded in the group ID field of the beacon frame transmitted by the MN2 511. Accordingly, the MN3 512 is informed of the change in the group ID value recorded in the beacon frame of the MN2 511, so that the MN3 512 can detect the disconnection of the connection channel between the MN3 512 and the existing group.

Instead of the method using the beacon frame, the disconnection of the connection channel may be detected by using a routing protocol. More specifically, as shown in FIG. 5B, when the communication between the MN1 504 and the relay 500 is disconnected, if there is no connection channel to the relay 500 in a routing table storing the connection channels which the MN3 505 searches by using the routing protocol, the MN3 505 can detect the disconnection of connection channel between the MN3 505 and the group.

In addition, when the communication between the MN1 504 and the relay 500 is disconnected, the advertisement frame periodically broadcasted by the relay 500 is not received by the MN3 505. Therefore, when the advertisement frame is not received for a predetermined time, the MN3 505 can detect the disconnection of the connection channel between the MN3 505 and the group.

Figure 6:
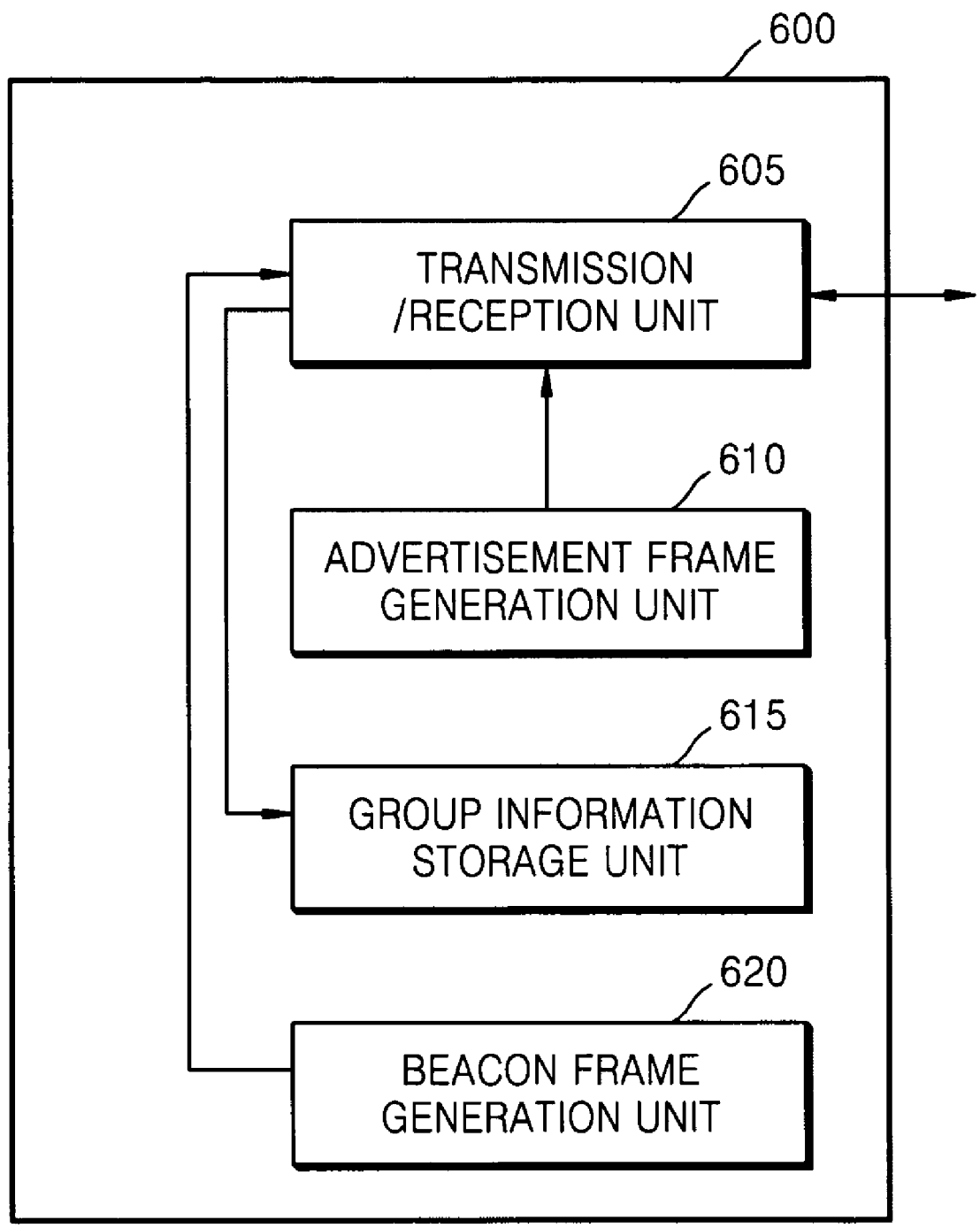
FIG. 6 is a view showing an internal structure of a relay according to an exemplary embodiment of the present invention.

FIG. 6 is a view showing an internal structure of a relay 600 according to an exemplary embodiment of the present invention.

As shown in FIG. 6, the relay 600 includes a transmission/reception unit 605, an advertisement frame generation unit 610, a group information storage unit 615, and a beacon frame generation unit 620. The transmission/reception unit 605 receives and transmits the frame from and to an external network. The transmission/reception unit 605 includes both the wired network interface and the wireless network interface.

The advertisement frame generation unit 610 generates an advertisement frame including a MAC address of the relay 600 and periodically broadcasts the advertisement frame to the wireless network. When a mobile node which detects the presence of the relay 600 by receiving the advertisement frame transmits a frame including the MAC address thereof, the group information storage unit 615 extracts the MAC address of the mobile node from the received frame and stores the extracted MAC address so as to allow the mobile node to subscribe to a group managed by the relay 600. The beacon frame generation unit 620 generates the aforementioned beacon frame and transmits the beacon frame to all the nodes which exist within a predetermined distance.

Figure 7:
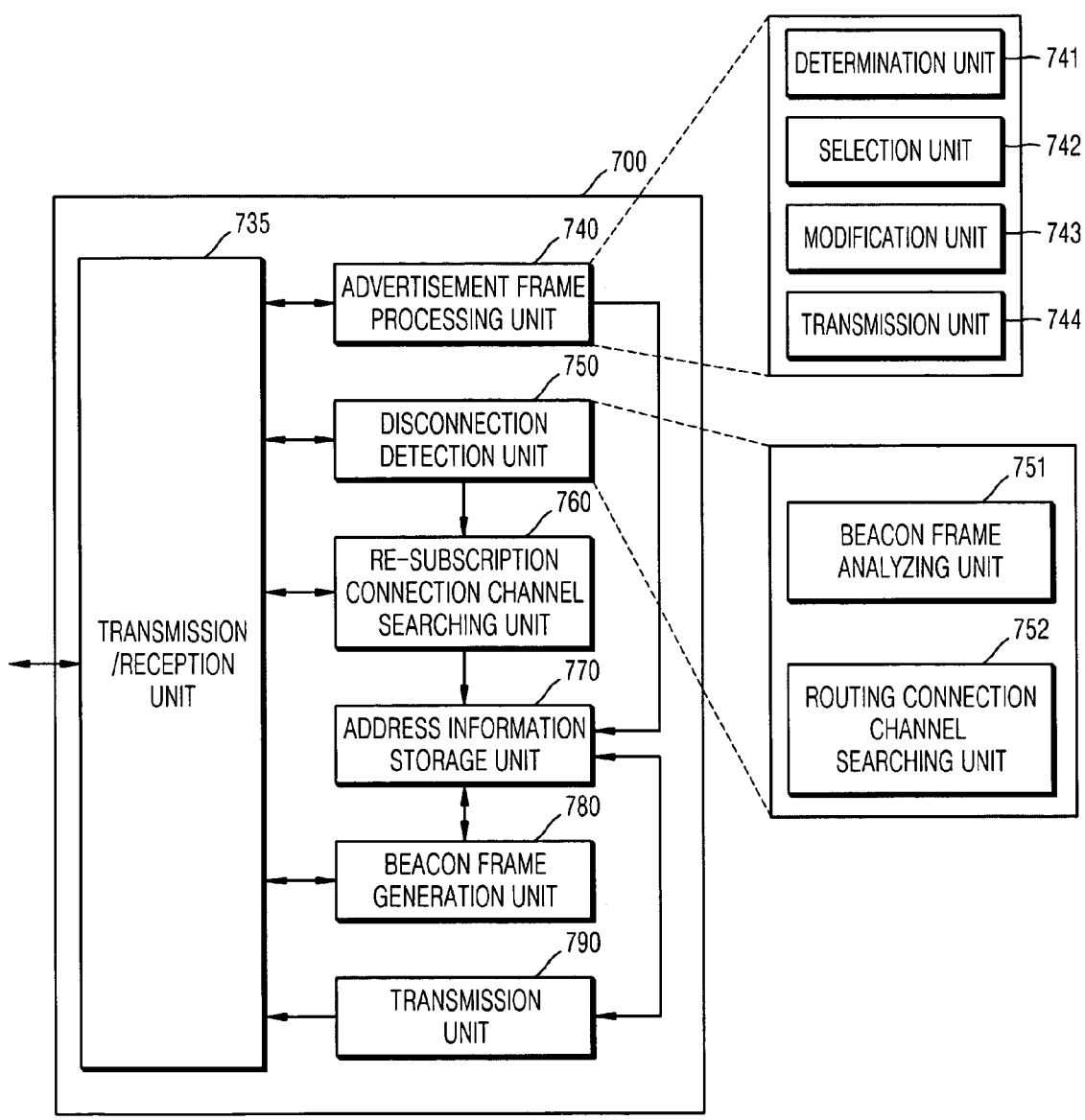
FIG. 7 is a view showing an internal structure of a mobile node according to an exemplary embodiment of the present invention.

FIG. 7 is a view showing an internal structure of a mobile node 700 according to an exemplary embodiment of the present invention.

The mobile node 700 includes a transmission/reception unit 735, an advertisement frame processing unit 740, a disconnection detection unit 750, a re-subscription connection channel searching unit 760, an address information storage unit 770, a beacon frame generation unit 780, and a transmission unit 790. The transmission/reception unit 735 receives and transmits data to and from the wireless network. The advertisement frame processing unit 740 processes the advertisement frame transmitted by the relay. As shown in FIG. 7, the advertisement frame processing unit 740 includes a determination unit 741, a selection unit 742, a modification unit 743, and a transmission unit 744. The determination unit 741 determines whether or not a sequence number of the received advertisement frame is a redundantly received one and discards the redundantly received advertisement frame. When the advertisement frame is received, the selection unit 742 selects the group and the parent node with reference to the group ID and the MAC address of the transmitting member included in the advertisement frame.

When the advertisement frame is selected, the modification unit 743 records the MAC address of the mobile node 700 in the MAC address field of the transmitting member of the advertisement frame before forwarding the advertisement frame in a broadcast manner. The transmission unit 744 broadcasts the advertisement frame modified by the modification unit 743 to transmit the advertisement frame to the other mobile nodes. The disconnection detection unit 750 detects the connection of the connection channel between the grouped mobile node 700 and the group. The disconnection detection unit 750 includes a beacon frame analyzing unit 751 and a routing connection channel searching unit 752. As described above, the beacon frame analyzing unit 751 detects the reception of the beacon frame and the disconnection of the connection channel with reference to the group ID included in the beacon frame. The routing connection channel searching unit 752 searches for a routing connection channel to the relay managing the existing group by using the routing protocol so as to detect the disconnection of the channel connection from the group.

When the disconnection detection unit 750 detects the disconnection of the connection channel between the mobile node 700 and the group, the re-subscription connection channel searching unit 760 performs a procedure of re-subscription to the existing groups or other groups.

The re-subscription connection channel searching unit 760 analyzes the received beacon frame to determine whether or not the beacon frame is received from mobile nodes included in other groups excluding the existing group or a relay managing other groups. In addition, the re-subscription connection channel searching unit 760 searches for a routing connection channel to the existing group or other group transmitting the received beacon frame by using the routing protocol and stores the MAC addresses of the mobile nodes or relays associated with the searched connection channel in the address information storage unit 770.

In addition, the address information storage unit 770 stores the group ID, that is, the MAC address of the relay, MAC address of the parent node, and the like.

The beacon frame generation unit 780 generates the aforementioned beacon frame and transmits the beacon frame to all the nodes which exist within a predetermined distance.

The transmission unit 790 transmits an arbitrary frame including the MAC address of the mobile node 700 to the relay selected by the advertisement frame processing unit 740 so as to allow the relay to register the mobile node 700 as a group member.

Figure 8:
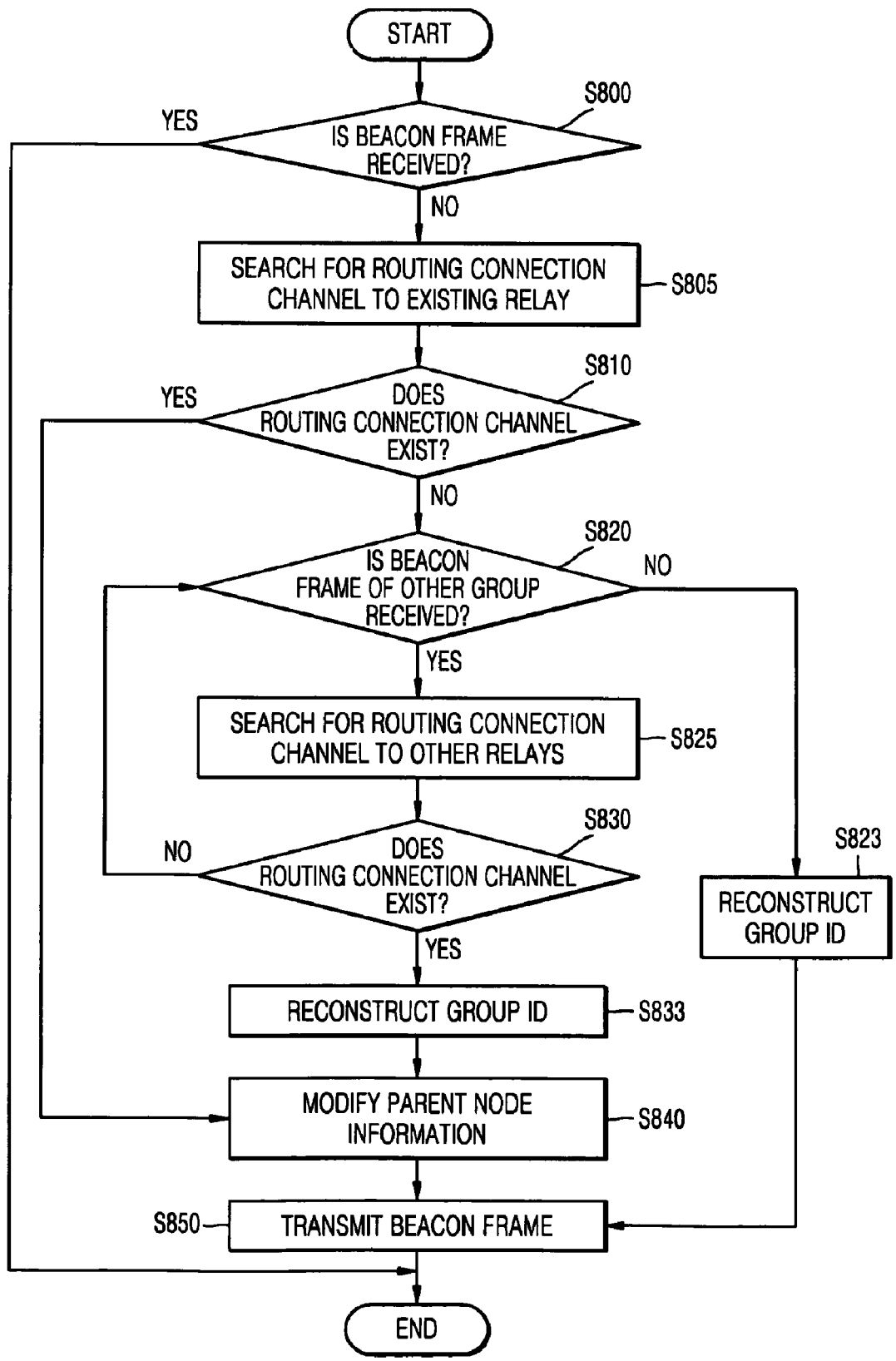
FIG. 8 is a flowchart showing a procedure performed by a mobile node to detect disconnection of a connection channel from an existing group by using a beacon frame and re-subscribing to the group according to an exemplary embodiment of the present invention.

FIG. 8 is a flowchart showing a procedure performed by a mobile node to detect the disconnection of the connection channel from the existing group by using the beacon frame and re-subscribing to the group according to an exemplary embodiment of the present invention.

The mobile node checks the beacon frame periodically received from the parent node (S800). If the beacon frame is not received for a predetermined time, the mobile node determines that the connection channel to the existing group is disconnected. In order to try to re-subscribe to the existing group, the mobile node searches for a routing connection channel to the relay managing the existing group by using the routing protocol (S805).

If the routing connection channel is detected (S810), the MAC address of the node closest to the detected connection channel is selected as a parent node (S840) to acquire the connection channel to the existing group. If the routing connection channel is not detected, in order to try to subscribe to other groups, the beacon frames which are received from neighboring nodes are analyzed to determine whether or not the beacon frames which were transmitted by the nodes subscribing to other groups are received (S820). If the beacon frames of other groups are not received, the mobile node cannot subscribe to any group, so that the group ID is set to 0 (S823) and the beacon frame is transmitted (S850).

If the beacon frame of other group is received, the MCA address of the relay managing the group is extracted from the beacon frame, and it is checked whether or not there is a routing connection channel to the relay by using the routing protocol (S825). If there is no routing connection channel (S830), it is detected whether or not the beacon frame of other groups are received (S820). If there is a routing connection channel, the group ID is modified with the MAC address of the relay of the changed group (S833), and the node closest to the detected routing connection channel is selected as a parent node (S840), so that the connection channel to other groups can be acquired. Next, a beacon frame including the modified information is transmitted (S850).

Figure 9:
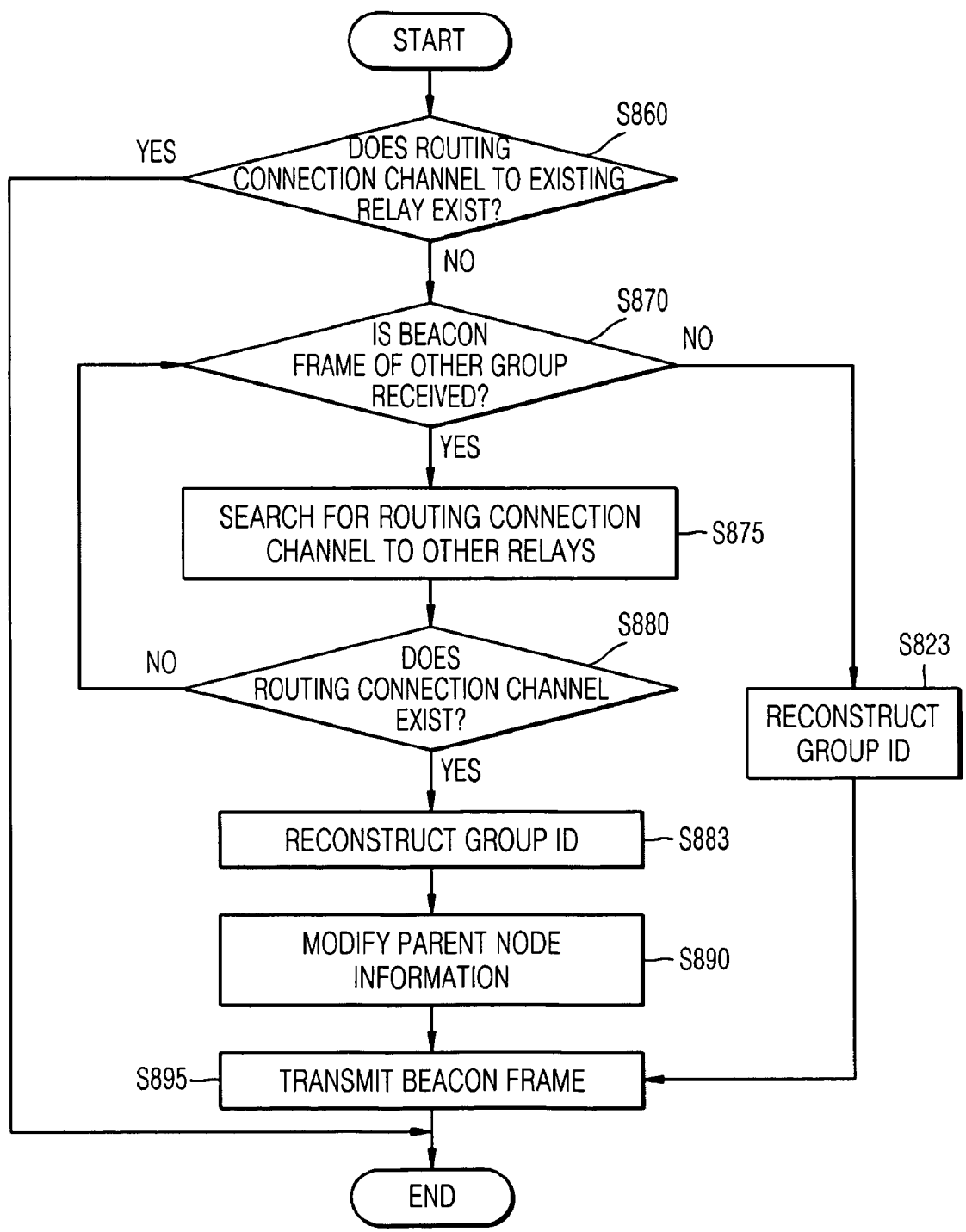
FIG. 9 is a flowchart showing a procedure performed by a mobile node to detect disconnection of a connection channel from an existing group by using a routing protocol and re-subscribing to the group according to an exemplary embodiment of the present invention.

FIG. 9 is a flowchart showing a procedure performed by a mobile node to detect the disconnection of the connection channel from the existing group by using a routing protocol and re-subscribing to the group according to an exemplary embodiment of the present invention.

The mobile node checks whether or not there is a routing connection channel to the relay managing the existing group by using the routing protocol (S860). If there is no routing connection channel, the mobile node tries to re-subscribe to other groups. The procedures as shown in FIG. 9 are similar to those shown in FIG. 8, and thus, detailed description thereof is omitted. The exemplary embodiments of the present invention can be written as computer programs and can be implemented in general-use digital computers that execute the programs using a computer readable recording medium.

Examples of the computer readable recording medium include magnetic storage media e.g., ROM, floppy disks, hard disks, etc., and optical recording media e.g., CD-ROMs, or DVDs).

According to exemplary embodiments of the present invention, mobile nodes are grouped in a structure having one connection channel where all the mobile nodes approach a specific relay so that the relay can manage the mobile nodes in a group, and when the connection channel between a mobile node and the group is disconnected, the mobile node detects the disconnection of the connection channel so as to subscribe to the existing group or other groups. Thus, it is possible to prevent broadcast storm in which broadcasted frames are repetitively transmitted along a loop in an extended wireless LAN architecture.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of allowing a mobile node subscribing in a predetermined group among a plurality of groups, each group constructed with mobile nodes that intercommunicate and have a function of frame-routing in a wireless network, to re-subscribe to any one of the groups, the method comprising:

determining whether or not a connection channel of the mobile node to the predetermined group is disconnected;

searching other connection channels of the mobile node to the plurality of groups based on a result of the determination;

setting an updated connection channel of the mobile node to any one of the plurality of groups based on a result of the searching; and receiving at the mobile node a first frame including identification information of a fixed node in order to inform the mobile node of the presence of the fixed node, wherein the frame includes a sequence number having a value which is different according to a time when the fixed node broadcasts the frame as information for determining whether or not the broadcasted frame is redundantly received by a recipient, wherein the searching comprises, if it is determined that the connection channel to the predetermined group is disconnected, searching connection channels to the predetermined group first, and then if searching of the connection channels to the predetermined group fails, searching connection channels to the other groups, and wherein the method further comprises receiving by the mobile node, a second frame including the identification number of the fixed node and a sequence number having the same value as the value of the first frame via different routing paths to the fixed node and selecting by the mobile node, one of the first frame and the second frame.

2. The method of claim 1, wherein in the searching the other channels, when the connection channel is determined to be disconnected, the updated connection channel, which is constructed with mobile nodes subscribing to an arbitrary group managed by a fixed node and through which the mobile node is connected, is searched.

3. The method of claim 1, wherein in the determining disconnection, when a predetermined frame, which is periodically received through a previously-set connection channel from a fixed node managing the predetermined group, is not received for a predetermined time period, the connection channel is determined to be disconnected.

4. The method of claim 1, wherein in the determining disconnection, when a routing path, through which the mobile node is connected to a fixed node managing the predetermined group and which is constructed with the mobile nodes of the predetermined group, is not searched by using a routing protocol, the connection channel is determined to be disconnected.

5. The method of claim 1, wherein in the determining disconnection, when a beacon frame, which a node that is closest to the mobile node in the predetermined group among nodes that construct the connection channel through which the mobile node is connected to a fixed node managing the predetermined group repeatedly transmits to all nodes within a predetermined distance, is not received for a predetermined time period, the connection channel is determined to be disconnected.

6. The method of claim 1, wherein in the determining disconnection, when identification information of fixed nodes recorded in a beacon frame which a node, which is closest to the mobile node in the predetermined group among nodes that construct the connection channel through which the mobile node is connected to a fixed node managing the predetermined group, transmits to all nodes within a predetermined distance is different from identification information of the fixed node managing the predetermined group, the connection channel is determined to be disconnected.

7. The method of claim 1, wherein in the determining disconnection, when a frame which a fixed node managing the predetermined group repeatedly transmits is not received for a predetermined time period, the connection channel is determined to be disconnected.

8. The method of claim 1, wherein in the searching the other channels, a routing path to a fixed node managing the predetermined group is searched using a routing protocol.

9. The method of claim 1, wherein the searching the other channels comprises:
determining whether or not a beacon frame, repetitively transmitted to all nodes within a predetermined distance by another fixed node other than a fixed node in the predetermined group or a mobile node subscribing to a group of another fixed node, is received; and
searching for a routing path to another fixed node using a routing protocol when the beacon frame is determined to be received.

10. A non-transitory computer readable recording medium having embodied thereon a computer program for executing a method of allowing a mobile node subscribing in a predetermined group among a plurality of groups, each group constructed with mobile nodes that intercommunicate and have a function of frame-routing in a wireless network, to re-subscribe to any one of the groups, the method comprising:
determining whether or not a connection channel of the mobile node to the predetermined group is disconnected;
searching other connection channels of the mobile node to the plurality of groups based on a result of the determination;
setting an updated connection channel of the mobile node to any one of the plurality of groups based on a result of the searching; and
receiving at the mobile node a first frame including identification information of a fixed node in order to inform the mobile node of the presence of the fixed node,
wherein the frame includes a sequence number having a value which is different according to a time when the fixed node broadcasts the frame as information for determining whether or not the broadcasted frame is redundantly received by a recipient,
wherein the searching comprises, if it is determined that the connection channel to the predetermined group is disconnected, searching connection channels to the predetermined group first, and then if searching of the connection channels to the predetermined group fails, searching connection channels to the other groups, and
wherein the method further comprises receiving by the mobile node, a second frame including the identification number of the fixed node and a sequence number having the same value as the value of the first frame via different routing paths to the fixed node and selecting by the mobile node, one of the first frame and the second frame.

11. An apparatus serving as a mobile node having a function of frame-routing in a wireless network, the apparatus comprising:
a transmission and reception unit which receives a first frame including identification information of a fixed node connecting the wireless network with another network different from the wireless network;
a frame processing unit which processes the received frame;
a determination unit which determines whether or not to subscribe to a group managed by the fixed node connecting the wireless network with another network different from the wireless network when the frame including identification information of the fixed node is received;
a connection channel setting unit which sets a connection channel to the fixed node based on a determination of the determination unit;
a transmission unit which transmits the identification information of the mobile node to the fixed node so as to allow the fixed node to register the mobile node as a member of the group;
a disconnection detection unit which detects whether or not the set connection channel to the fixed node is disconnected after the fixed node registers the mobile node as a member of the group; and
a re-subscription connection channel searching unit which searches for an updated connection channel so as to re-subscribe to the group or another group different from the group when the set connection channel is disconnected,
wherein the connection channel searching unit, when the set connection channel to the fixed node is disconnected, searches for a connection channel first so as to re-subscribe to the group managed by the fixed node, and then if searching of the connection channel fails, searches for a connection channel to another group different from the group managed by the fixed node, wherein the identification information of the fixed node informs of the presence of the fixed node, wherein the frame also includes a sequence number having a value which is different according to a time when the fixed node broadcasts the frame as information for determining whether or not the broadcasted frame is redundantly received by a recipient, and wherein the transmission and reception unit receives a second frame including the identification number of the fixed node and a sequence number having the same value as the value of the first frame via different routing paths to the fixed node and the frame processing unit selects one of the first frame and the second frame.

* * * * *